(12) United States Patent
Minakuchi

(10) Patent No.: US 8,528,437 B2
(45) Date of Patent: Sep. 10, 2013

(54) BALL SCREW APPARATUS

(75) Inventor: Junji Minakuchi, Gunma (JP)

(73) Assignees: NSK Ltd., Tokyo (JP); NSK Precision Co., Ltd., Tokyo (JP)

( * ) Notice: Subject to any disclaimer, the term of this patent is extended or adjusted under 35 U.S.C. 154(b) by 1040 days.

(21) Appl. No.: 11/059,347

(22) Filed: Feb. 17, 2005

(65) Prior Publication Data

US 2005/0178228 A1 Aug. 18, 2005

(30) Foreign Application Priority Data

Feb. 17, 2004 (JP) .............................. P. 2004-040171

(51) Int. Cl.
*F16H 25/22* (2006.01)

(52) U.S. Cl.
USPC ................... 74/424.86; 74/424.82; 74/89.41

(58) Field of Classification Search
USPC ........ 74/89.41, 89.4, 424.81, 424.82, 424.86, 74/424.88; 384/43, 45, 51, 520; 411/517, 411/518, 519, 353
IPC ........................................................ F16H 25/22
See application file for complete search history.

(56) References Cited

U.S. PATENT DOCUMENTS

| | | | | |
|---|---|---|---|---|
| 2,203,154 A | * | 6/1940 | Johnston | 277/457 |
| 3,669,460 A | * | 6/1972 | Wysong | 277/354 |
| 4,052,076 A | * | 10/1977 | Wysong | 74/89.4 |
| 4,286,793 A | * | 9/1981 | Ploss et al. | 74/424.87 |
| 4,407,511 A | * | 10/1983 | Benton et al. | 74/89.4 |
| 5,154,091 A | * | 10/1992 | Bianco | 74/424.86 |
| 5,664,459 A | * | 9/1997 | Muhleck et al. | 74/424.87 |
| 5,937,700 A | * | 8/1999 | Brown et al. | 74/424.86 |
| 2001/0037699 A1 | * | 11/2001 | Abe et al. | 74/424.88 |
| 2003/0213322 A1 | * | 11/2003 | Yabe | 74/424.82 |
| 2004/0016312 A1 | * | 1/2004 | Yabe et al. | 74/89.4 |

FOREIGN PATENT DOCUMENTS

| | | |
|---|---|---|
| DE | 10101054 A1 | 7/2001 |
| EP | 1363046 A2 | 11/2003 |
| JP | 3034052 U | 2/1997 |
| JP | 2003-269564 A | 9/2003 |

* cited by examiner

*Primary Examiner* — Phillip A Johnson
*Assistant Examiner* — Daniel Yabut
(74) *Attorney, Agent, or Firm* — Sughrue Mion, PLLC

(57) ABSTRACT

In a ball screw apparatus according to the present invention, a ball guide path 19 for guiding a ball 15 scooped up in a tangential direction of a ball center track circle to a ball return path 17 is formed between a ball guide face 182 of a ball circulating member 18 and a ball guide path forming face 20 that is provided at a nut 12. Accordingly, it is possible to provide a ball screw apparatus capable of scooping up a ball in a tangential direction of a ball center track circle to circulate without reducing a diameter of the ball even when a groove interval of a ball screw groove is narrow or when the ball screw groove is a multistreak screw groove.

7 Claims, 4 Drawing Sheets

BALL SCREW APPARATUS

The present application claims foreign priority under 35 USC 119 based on Japanese Patent Application No. 2004-40171, filed on Feb. 17, 2004, the contents of which is incorporated herein by reference in its entirety, and concurrently with the filing of this U.S. patent application.

BACKGROUND OF THE INVENTION

The present invention relates to a ball screw apparatus used in a machine tool, a semiconductor fabricating apparatus, a board mounting machine and the like.

In a machine tool, a semiconductor fabricating apparatus, a board mounting machine or the like, there is used a ball screw apparatus of a tube circulating type as shown by JP-A-2003-269564, shown below, in a related art as an apparatus of converting rotational movement into linear movement. However, the ball screw apparatus adopts a system of scooping up to circulate a ball rolling between ball screw grooves formed at an outer peripheral face of a screw shaft and an inner peripheral face of a nut by a tongue portion of a circulating tube and therefore, there poses a problem that vibration or noise is brought about when the ball collides with the tongue portion of the circulating tube.

In order to resolve the problem, in Japanese Utility Model No. 3034052, shown below, there is disclosed a ball screw apparatus of scooping up a ball rolling between ball screw grooves of a screw shaft and a nut in a tangential direction of a ball center track circle by a ball scoop up portion of a ball circulating member integrated to an end portion of the nut and introducing the scooped up ball to a ball return path formed at the nut to circulate.

However, according to the ball screw apparatus described in Japanese Utility Model No. 3034052, mentioned above, a ball guide path for guiding the ball scooped up in the tangential direction of the ball center track circle to the ball return path of the nut is formed only by the ball circulating member. Therefore, when a groove interval between the ball screw grooves is narrow or when the ball screw grooves are constituted by multistreak screw grooves, a containing recess portion of the ball circulating member formed at an end portion of the inner peripheral face of the nut interferes with the ball screw groove on a side of the nut and therefore, there poses a problem that a diameter of the ball needs to be reduced in order to prevent interference between the containing recess portion and the ball screw groove on the side of the nut. Further, according to the above-described ball screw apparatus, there is needed a circular arc shape spring ring for fixing the ball circulating member to an axial direction of the nut and therefore, there poses a problem that a number of parts is increased.

SUMMARY OF THE INVENTION

The invention has been carried out by paying attention to the problems and it is an object thereof to provide a ball screw apparatus capable of scooping up and circulating a ball in a tangential direction of a ball center track circle without reducing a diameter of the ball even when a groove interval between ball screw grooves is narrow or when a ball screw groove is a multistreak screw groove.

The above-described object can be achieved by a ball screw apparatus, according to the present invention, comprises:

- a screw shaft having a ball screw groove at an outer peripheral face thereof;
- a nut having a ball screw groove opposed to the ball screw groove of the screw shaft at an inner peripheral face thereof, and also having a recess portion formed at at least one of both end portions thereof;
- a number of balls arranged between the ball screw groove of the screw shaft and the ball screw groove of the nut;
- a ball circulating member attached to the recess portion; and
- a fixing member for fixing the ball circulating member to the nut in an axial direction of the nut, wherein the nut has a ball return path to circulate the ball, the ball circulating member comprises a ball scoop up portion by which the ball that rolls between the ball screw grooves of the screw shaft and the nut is scooped up in a tangential direction of a ball center track circle, and the thus scooped up ball is introduced into the ball return path, and a ball guide path is defined between a ball guide path forming face of the nut and a ball guide face formed at the ball circulating member, for guiding the ball scooped up in the tangential direction of the ball center track circle to the ball return path.

Further, in the ball screw apparatus according to the present invention, it is preferable that the fixing member comprises a spring ring for fixing the ball circulating member unmovably in an axial direction of the nut in cooperation with a fixing groove formed at the inner peripheral face of the nut.

Moreover, in the ball screw apparatus according to the present invention, the spring ring may be a circular arc shape spring ring that has a C-shaped main body and an elastically deformable portion for coupling the both ends of the C-shaped main body.

In the above-mentioned ball screw apparatus according to the invention, it is advantageous that the ball circulating member and the spring ring are formed integrally by a synthetic resin.

In the above-mentioned ball screw apparatus according to the invention, it is also advantageous to further comprise a ball retainer that is made of a resin and is disposed between each adjacent balls in the number of balls.

According to the ball screw apparatus of the present invention, by providing the ball guide path forming face for forming the ball guide path that guides the ball which has been scooped up in the tangential direction of the ball center track circle by the ball scoop up portion to the ball return path in cooperation with the ball circulating member at the nut, in comparison with a constitution of forming the ball guide path only by the ball circulating member, a size of the ball circulating member can be reduced. Thereby, it is nor necessary to reduce the diameter of the ball in order to prevent interference between the recess portion and the ball screw groove on the side of the nut and therefore, the ball can be scooped up in the tangential direction of the ball center track circle to circulate without reducing the diameter of the ball even when the groove interval of the ball screw groove is narrow or when the ball screw groove is a multistreak screw groove.

In the case where the ball circulating member and the spring ring are formed integrally by a synthetic resin according to the present invention, the circular arc shape spring ring is not needed as a separate part other than the ball circulating member and therefore, in addition to the above-described effect, a reduction in a number of parts can be achieved.

Further, in the case where the ball screw apparatus according to the present invention has a ball retainer that is made of a resin and is disposed between each adjacent balls in the number of balls, abrasive and frictional contact of the balls is alleviated by the ball retainer and therefore, in addition to the

DETAILED DESCRIPTION OF THE PREFERRED EMBODIMENTS

An embodiment of the invention will be explained in reference to the drawings as follows.

Figure 1:
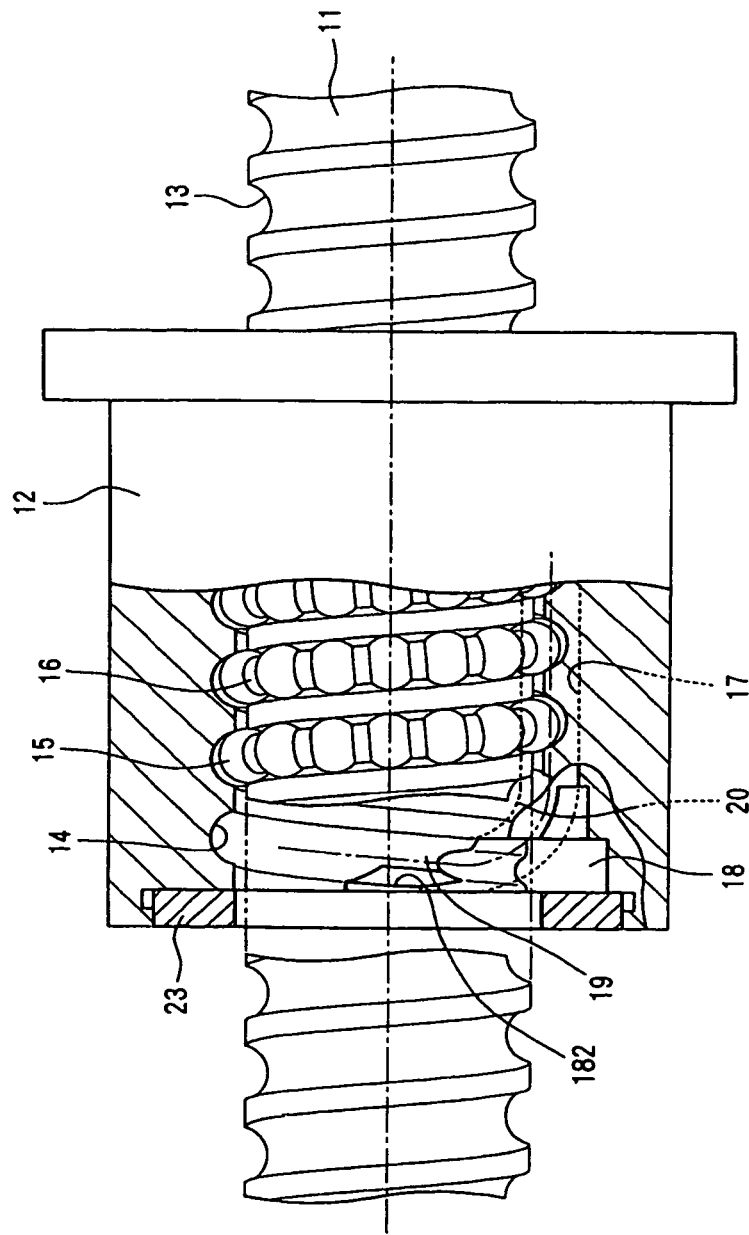
FIG. 1 is a view showing an outline constitution of a ball screw apparatus according to an embodiment of the invention.
Figure 2:
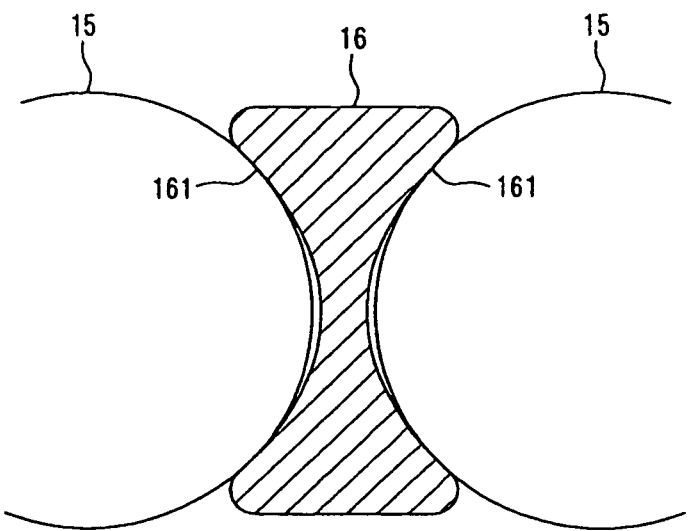
FIG. 2 is a sectional view of a ball retainer shown in FIG. 1.
Figure 3:
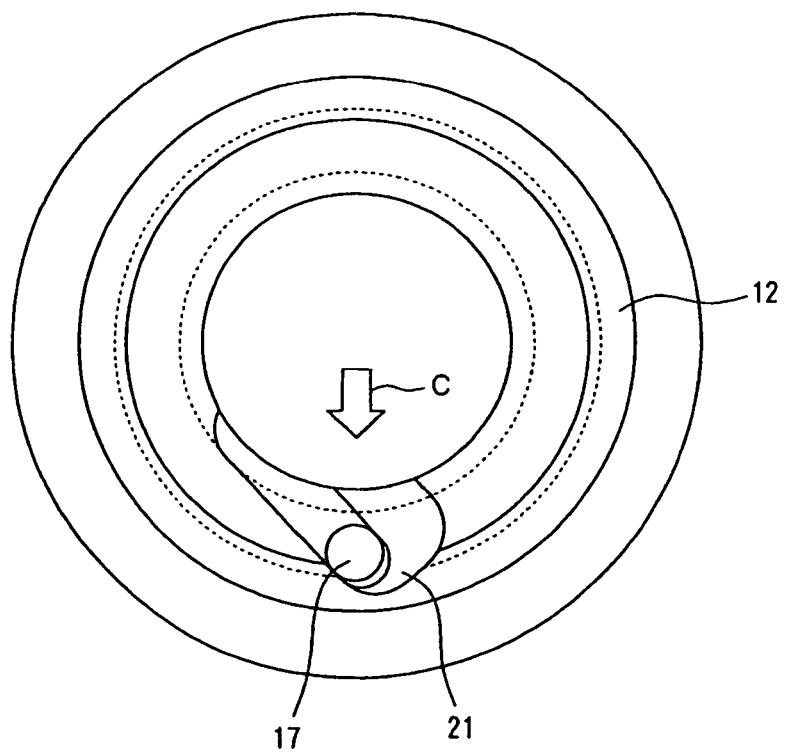
FIG. 3 is a front view of a nut shown in FIG. 1.
Figure 4:
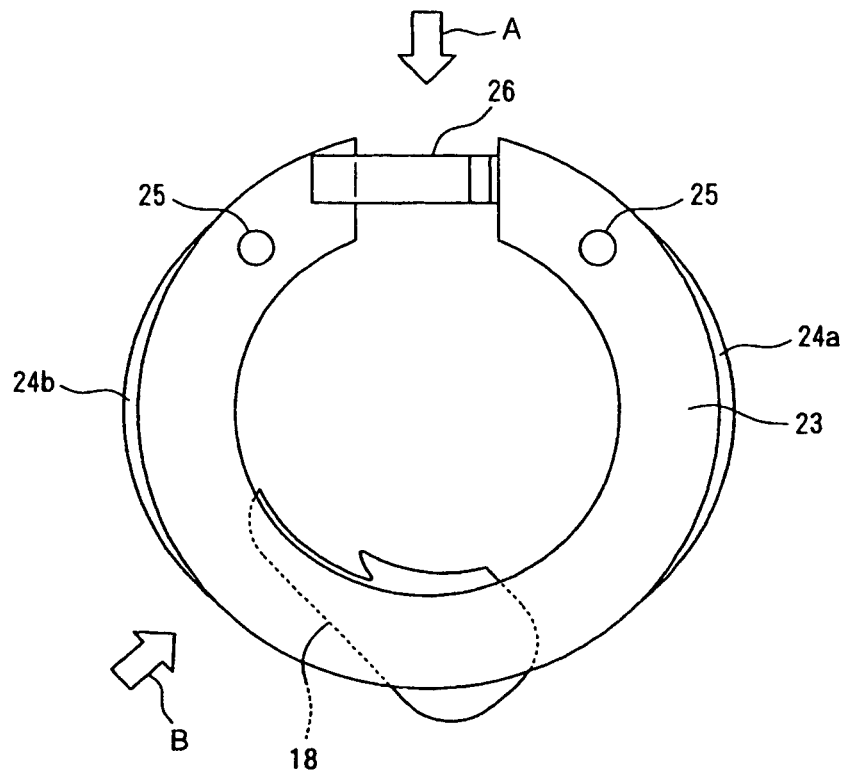
FIG. 4 is a front view of a circular arc shape spring ring shown in FIG. 1.
Figure 5:
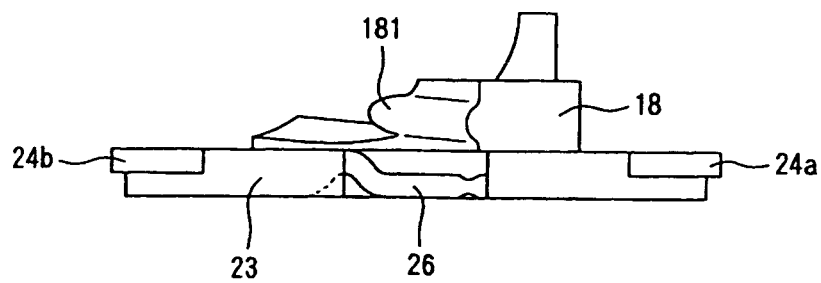
FIG. 5 is a view viewing the circular arc shape spring ring shown in FIG. 4 from an arrow mark A direction.
Figure 6:
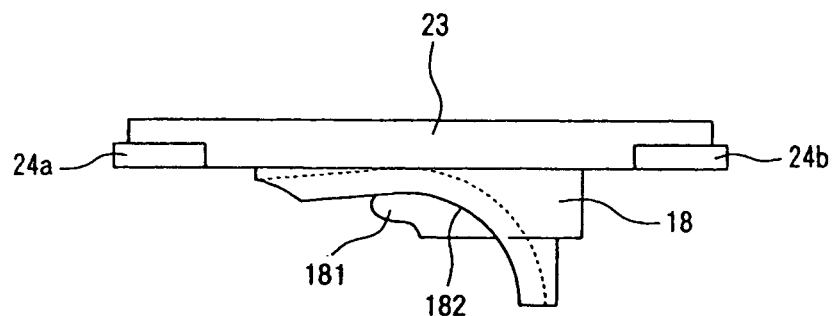
FIG. 6 is a view viewing the circular arc shape spring ring shown in FIG. 4 from an arrow mark B direction.
Figure 7:
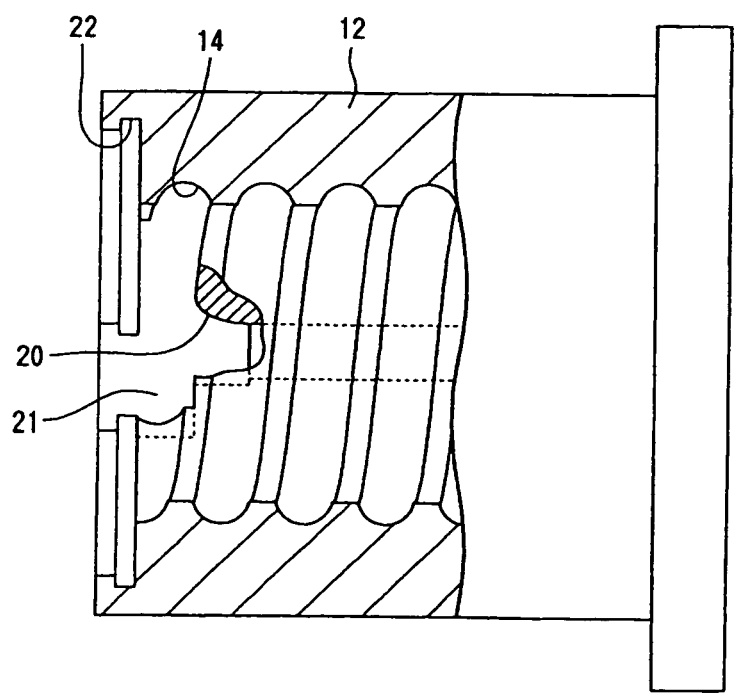
FIG. 7 is a view viewing a containing recess portion shown in FIG. 3 from an arrow mark C direction.

An embodiment of a ball screw apparatus according to the invention is shown in FIG. 1 through FIG. 7. In FIG. 1, notation 11 designates a screw shaft, notation 12 designates a nut having a ball screw groove 14 opposed to a ball screw groove 13 formed at an outer peripheral face of the screw shaft 11 at an inner peripheral face thereof, and a number of balls 15 are arranged between the ball screw groove 13 and the ball screw groove 14.

The ball 15 is formed by steel, ceramics or the like and a ball retainer 16 comprising a synthetic resin is provided between the two contiguous balls 15, 15. The ball retainer 16 is formed in a shape of a circular disk by a diameter more or less smaller than a diameter of the ball 15, and each of both end faces of the ball retainer 16 is formed with a recessed spherical face 161 (so called as a Gothic-Arch shaped face) by two radius of curvatures more or less larger than a radius of the ball 15.

The ball 15 is made to roll between the ball screw grooves 13, 14 in accordance with rotational movement of the screw shaft 11 or the nut 12, and the nut 12 is formed with a ball return path 17 (refer to FIG. 3). The ball return path 17 is penetrated in an axial direction of the nut 12 and both end portions of the nut 12 are integrated with ball circulating members 18 (refer to FIG. 1) for introducing the ball 15 rolled between the ball screw grooves 13, 14 to the ball return path 17 to circulate.

The ball circulating member 18 is formed by a synthetic resin in order to prevent noise, vibration or the like from being brought about. Further, the ball circulating member 18 includes a ball scoop up portion 181 (refer to FIG. 4 and FIG. 5) and the ball 15 rolling between the ball screw grooves 13, 14 is scooped up in a tangential direction of a ball center track circle by the ball scoop up portion 181 of the ball circulating member 18. Further, the ball circulating member 18 includes a ball guide face 182 (refer to FIG. 6) and the nut 12 is formed with a ball guide path forming face 20 (refer to FIG. 7). The ball guide face 182 and the ball guide path forming face 20 defines a ball guide path 19 (refer to FIG. 1) that guides the ball 15 from the ball scoop up portion 181 by which the ball is scooped up in the tangential direction of the ball center track circle to the ball return path 17.

Further, the ball circulating member 18 is contained in a containing recess portion 21 (refer to FIG. 3 and FIG. 7) formed at an end portion of the inner peripheral face of the nut 12, and the inner peripheral face of the nut 12 is formed with a fixing groove 22 (refer to FIG. 7) for fixing the ball circulating member 18 to the containing recess portion 21. The fixing groove 22 is engaged with a circular arc shape spring ring 23 (refer to FIG. 7) and the ball circulating member 18 is fixed unmovably in an axial direction of the nut 12 by the fixing groove 22 and the circular arc shape spring ring 23.

The circular arc shape spring ring 23 is formed by a synthetic resin member integrally with the ball circulating member 18 and an outer peripheral face of the circular arc shape spring ring 23 is provided with projected portions 24a, 24b in a crescent shape fitted to the fixing groove 22. Further, a bridging portion 26 (refer to FIG. 4) is molded by a resin integrally with the circular arc shape spring ring 23 between both ends of the circular arc shape spring ring 23 in order to restrain strain of the circular arc shape spring ring 23 after injection molding. Further, both end portions in a circumferential direction of the circular arc shape spring ring 23 are formed with ring inserting holes 25 for contracting a diameter of the circular arc shape spring ring 23 by a jig of pliers or the like.

In the case of the ball screw apparatus according to the embodiment constituted in this way, by providing the ball guide path forming face 20 for forming the ball guide path 19 for guiding the ball 15 scooped up in the tangential direction of the ball center track circle to the ball return path 17 between the ball guide path forming face 20 and the ball guide face 182 of the ball circulating member 18 at the nut 12, in comparison with the constitution of forming the ball guide path 19 only by the ball circulating member, a size of the ball circulating member 18 can be reduced. Thereby, it is not necessary to reduce the diameter of the ball 15 in order to prevent interference between the containing recess portion 21 and the ball screw groove 14 on the side of the nut and therefore, the ball 15 can be scooped up in the tangential direction of the ball center track circle to circulate without reducing the diameter of the ball 15 even when the groove interval between the ball screw grooves 13, 14 is narrow or when the ball screw grooves 13, 14 are multistreak screw grooves.

Further, in the case of the ball screw apparatus according to the embodiment, by forming the ball circulating member 18 and the circular arc shape spring ring 23 integrally by the synthetic resin member, the circular arc shape spring ring is not needed as a separate part and therefore, in addition to the above-described effect, a reduction in a number of parts can be achieved. Further, by providing the ball retainer 16 made of a resin between the two contiguous balls 15, 15 in a number of the balls 15, abrasive and frictional contact of the balls is alleviated by the ball retainer 16 and therefore, the screw shaft 11 or the nut 12 can be rotated at a high speed without generating abrasive and frictional contact between the balls 15.

Further, by providing the bridging portion 26 between the both ends of the circular arc shape spring ring 23, strain of the circular arc shape spring ring 23 after injection molding can be restrained. Further, when the circular arc shape spring ring 23 is mounted to the fixing groove 22 of the nut 12, the diameter of the circular arc shape spring ring 23 is contracted by a jig of pliers or the like and the projected portions 24a, 24b of the circular arc shape spring ring 23 are fitted to the fixing groove 22 of the nut 12 and by elastically recovering the bridging portion 26 which has been elastically deformed by contracting the diameter of the circular arc shape spring ring 23, the projected portions 24a, 24b of the circular arc shape spring ring 23 can be prevented from being drawn out from the fixing groove 22 of the nut 12 by an elastic force of the bridging portion 26.

While the invention has been described above with reference to the embodiment, the technical range of the invention is not restricted to the range described in the embodiment. It is apparent to the skilled in the art that various changes or improvements can be made in the embodiment. It is apparent from the appended claims that the embodiment thus changed or improved can also be included in the technical range of the invention.

What is claimed is:

1. A ball screw apparatus comprising:
   a screw shaft having a ball screw groove at an outer peripheral face thereof;
   a nut having a ball screw groove opposed to the ball screw groove of the screw shaft at an inner peripheral face thereof, and also having a recess portion formed at at least one of both end portions thereof,
   a number of balls arranged between the ball screw groove of the screw shaft and the ball screw groove of the nut,
   a ball circulating member attached to the recess portion, and
   a fixing member for fixing the ball circulating member to the nut in an axial direction of the nut in cooperation with a fixing groove formed at the inner peripheral face of the nut, and comprising a circular arc shape spring ring that has a C-shaped main body as viewed in the axial direction and an elastically deformable portion for coupling both ends of the C-shaped main body facing each other in a circumferential direction of the C-shaped main body, the elastically deformable portion extending between the ends of the C-shaped main body,
   wherein the nut has a ball return path to circulate the ball, said ball circulating member comprises a ball scoop up portion by which the ball that rolls between the ball screw grooves of the screw shaft and the nut is scooped up in a tangential direction of a ball center track circle, and the thus scooped up ball is introduced into the ball return path,
   a ball guide path is defined by first and second opposing surfaces respectively provided on the nut and the ball circulating member, for guiding the ball scooped up in the tangential direction of the ball center track circle to the ball return path,
   wherein the first and second opposing surfaces face each other,
   a projection is provided on an outer circumferential surface of the circular arc shape spring ring and projects radially therefrom,
   an elastic force of the elastically deformable portion prevents the projection from falling from the fixing groove of the nut,
   wherein the elastic force of the elastically deformable portion pushes on the ends of the C-shaped main body in directions which extend away from each other in the circumferential direction,
   wherein the ball circulating member, the elastically deformable portion and the circular arc shape spring ring are made of synthetic resin and are monolithic with each other, and
   wherein the projection is provided between the ball circulating member and the elastically deformable portion with respect to the circumferential direction.

2. The ball screw apparatus according to claim 1, further comprising:
   a ball retainer made of a resin and is provided between two of the balls contiguous to each other in the number of balls.

3. The ball screw apparatus as set forth in claim 1, wherein an inner circumferential surface of the ball guide path is formed on the nut, and wherein an outer circumferential surface of the ball guide path is formed on the ball circulating member.

4. The ball screw apparatus as set forth in claim 1, wherein the surface provided on the nut that defines the ball guide path has a curved portion.

5. The ball screw apparatus as set forth in claim 1, wherein the projection, the elastically deformable portion and the circular arc shape spring ring are made of synthetic resin and are monolithic with each other.

6. The ball screw apparatus as set forth in claim 1, wherein the circular arc shape spring ring is fitted in the fixing groove in a state that a diameter of the circular arc shape spring ring is made smaller than an original diameter of the circular arc shape spring ring before being fitted in the fixing groove.

7. The ball screw apparatus as set forth in claim 1, wherein the ball circulating member and the elastically deformable portion are provided on radially opposite sides of the circular arc shape spring ring.

* * * * *